(12) United States Patent
Wang

(10) Patent No.: US 12,277,010 B2
(45) Date of Patent: Apr. 15, 2025

(54) FLEXIBLE DISPLAY DEVICE

(71) Applicant: BOE TECHNOLOGY GROUP CO., LTD., Beijing (CN)

(72) Inventor: Xinyu Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/029,196

(22) PCT Filed: Jun. 22, 2022

(86) PCT No.: PCT/CN2022/100332
§ 371 (c)(1),
(2) Date: Mar. 29, 2023

(87) PCT Pub. No.: WO2023/245476
PCT Pub. Date: Dec. 28, 2023

(65) Prior Publication Data
US 2024/0361806 A1    Oct. 31, 2024

(51) Int. Cl.
*G06F 1/16* (2006.01)
(52) U.S. Cl.
CPC .......... *G06F 1/1652* (2013.01); *G06F 1/1681* (2013.01)
(58) Field of Classification Search
CPC ........ G06F 1/1652; G06F 1/16; G06F 1/1681; G06F 1/1641; G06F 1/1643; G06F 1/1601; G06F 1/1656; G06F 9/30; H05K 5/0017; H05K 5/0217; H05K 5/0226; H05K 5/03
See application file for complete search history.

(56) References Cited

U.S. PATENT DOCUMENTS

| | | | |
|---|---|---|---|
| 11,862,048 B2* | 1/2024 | Li | G09F 9/301 |
| 11,937,384 B2* | 3/2024 | Lee | G06F 1/1652 |
| 11,991,844 B2* | 5/2024 | Li | H05K 5/0217 |
| 12,124,298 B2* | 10/2024 | Chun | G06F 1/1616 |
| 2006/0007368 A1* | 1/2006 | Slikkerveer | G09F 9/301 349/58 |
| 2018/0011510 A1* | 1/2018 | Choi | G06F 11/3089 |
| 2018/0198899 A1* | 7/2018 | Lee | G06F 1/1652 |
| 2022/0158331 A1* | 5/2022 | Jeon | H01Q 1/38 |
| 2022/0240402 A1* | 7/2022 | Choi | H05K 5/03 |
| 2022/0317732 A1* | 10/2022 | Lee | G06F 1/1643 |

FOREIGN PATENT DOCUMENTS

| | | |
|---|---|---|
| CN | 107484425 A | 12/2017 |
| CN | 107526188 A | 12/2017 |
| CN | 107578704 A | 1/2018 |
| CN | 209657682 U | 11/2019 |
| CN | 212135822 U | 12/2020 |
| CN | 214504836 U | 10/2021 |
| KR | 20210129223 A | 10/2021 |

* cited by examiner

*Primary Examiner* — Abhishek M Rathod
(74) *Attorney, Agent, or Firm* — HOUTTEMAN LAW LLC

(57) ABSTRACT

The present disclosure provides a flexible display device including: a support structure, which is switchable between a rolled state and an unrolled state to switch a support surface of the support structure between a curved surface and a flat surface; a flexible display screen, at least a portion of which is fixed to the support surface of the support structure; a magnetic assembly including a plurality of first magnetic members disposed on the support structure, where the first magnetic members are configured to attracting one another in response to the support structure being in the rolled state.

18 Claims, 11 Drawing Sheets

FLEXIBLE DISPLAY DEVICE

TECHNICAL FIELD

The present disclosure relates to the field of display technology, in particular to a flexible display device.

BACKGROUND

Flexible displays are gradually favored by people due to their characteristics of lightness, thinness, bendability and good mechanical performance, and application fields of the flexible displays are more and more extensive.

In some application scenarios, the flexible display may be manufactured as a rollable display, is unrolled during being used, and is rolled up like a picture scroll during not being used.

SUMMARY

The present disclosure provides a flexible display device including:
- a support structure, which is switchable between a rolled state and an unrolled state to switch a support surface of the support structure between a curved surface and a flat surface;
- a flexible display screen, at least a portion of which is fixed onto the support surface of the support structure; and
- a magnetic assembly including a plurality of first magnetic members disposed on the support structure, where the first magnetic members are configured to attract one another in response to the support structure being in the rolled state.

In some implementations, first mounting recesses are provided on a surface of the support structure away from the support surface, the first magnetic members are arranged in the first mounting recesses.

In some implementations, the flexible display device further includes: a casing and a control mainboard, where the control mainboard is arranged inside the casing, the support structure is connected with the casing, and the support structure is wound on the casing during the support structure being in the rolled state;
the flexible display screen includes a display portion and a driving portion connected with the display portion, where the display portion is fixed on the support surface of the support structure, and the driving portion passes through a first hollow-out portion of the casing and is connected with the control mainboard.

In some implementations, a second mounting recess is provided on the casing, the magnetic assembly further includes a second magnetic member disposed in the second mounting recess, and the second magnetic member attracts the first magnetic members during the support structure being in the rolled state.

In some implementations, the support structure includes a plurality of support members each extending in a first direction, each support member includes a support sub-surface, support sub-surfaces of the support members jointly form the support surface, and every two adjacent support members are hinged with each other.

In some implementations, the casing includes: a first casing part and a second casing part arranged opposite to each other and connected to form a cylindrical structure; an outer surface of the first casing part has a first edge and a second edge arranged opposite to each other, an outer surface of the second casing part has a third edge and a fourth edge arranged opposite to each other, the first edge, the second edge, the third edge and the fourth edge each extend along the first direction, the first edge is adjacent to the third edge, and the second edge is adjacent to the fourth edge;
a step is formed between a portion of the outer surface of the first casing part close to the first edge and a portion of the outer surface of the second casing part close to the third edge, the plurality of support members includes: a first support member and a plurality of second support members that are connected successively, the first support member is fixed to a position on the outer surface of the second casing part close to the third edge.

In some implementations, an outer surface of the cylindrical structure includes a plurality of flat surfaces, a surface of each support member facing the cylindrical structure is substantially parallel to one of the flat surfaces during the support structure being in the rolled state.

In some implementations, the first casing part includes first connection surfaces connected between an inner surface and an outer surface of the first casing part, the second casing part includes second connection surfaces connected between an inner surface and an outer surface of the second casing part, the first connection surfaces are in contact with the second connection surfaces;
the casing further includes a positioning assembly, which includes a positioning pillar and a positioning recess, one of the positioning pillar and the positioning recess is provided on the first connection surface, and the other of the positioning pillar and the positioning recess is provided on the second connection surface, the positioning pillar is inserted into the positioning recess.

In some implementations, the plurality of support members are divided into a plurality of groups, each group includes multiple support members, and the support members in a same group are sequentially stacked in a radial direction of the cylindrical structure during the support structure being in the rolled state;
for any two of the support members in the same group, a width of the support member closer to the cylindrical structure is less than a width of the support member farther away from the cylindrical structure.

In some implementations, the casing further includes a first cover plate and a second cover plate that are disposed opposite to each other, the first cover plate and the second cover plate are respectively disposed at two ends of the cylindrical structure and are fixedly connected to the cylindrical structure, the first cover plate, the second cover plate and the cylindrical structure form an accommodating chamber, and the control mainboard is located in the accommodating chamber.

In some implementations, a first limit protrusion and a second limit protrusion are provided on an inner surface of the cylindrical structure, a first limit recess is provided on a surface of the first cover plate facing the second cover plate, and at least part of the first limit protrusion is located in the first limit recess; a second limit recess is provided on a surface of the second cover plate facing the first cover plate, and at least part of the second limit protrusion is located in the second limit recess.

In some implementations, a second hollow-out portion is arranged in the first cover plate, and the second hollow-out portion exposes an external interface on the control mainboard, and the external interface is configured to connect an external device.

In some implementations, the flexible display device further includes a mainboard mounting board provided inside the casing, the mainboard mounting board is connected to the casing, and the control mainboard is fixed to the mainboard mounting board.

In some implementations, each support member includes a body portion extending in the first direction, and connection portions at both ends of the body portion, the connection portions are fixedly connected to the body portion;

every two adjacent support members are connected through a hinge assembly, and the hinge assembly includes: a first shaft sleeve, a second shaft sleeve and a pin shaft, where the first shaft sleeve and the second shaft sleeve are respectively fixed on the connection portions of two adjacent support members, a first pin hole is formed in the first shaft sleeve, a second pin hole coaxial with the first pin hole is formed in the second shaft sleeve, the pin shaft is inserted into the first pin hole and the second pin hole and extends along the first direction, and the two adjacent support members relatively rotate around an axis of the pin shaft.

In some implementations, the hinge assembly further includes a limit structure connected with at least one of the first shaft sleeve and the second shaft sleeve and configured to limit an angle that the two adjacent support members relatively rotate.

In some implementations, the limit structure includes: a first bump and a first recess arranged at an end of the first shaft sleeve close to the second shaft sleeve; and a second bump and a second recess arranged at an end of the second shaft sleeve close to the first shaft sleeve;

the first recess includes a first limit surface and a second limit surface, the second recess includes a third limit surface and a fourth limit surface, at least part of the first bump is located in the second recess, at least part of the second bump is located in the first recess, in response to that the two adjacent support members rotate relatively, the first bump moves between the third limit surface and the fourth limit surface, and the second bump moves between the first limit surface and the second limit surface.

BRIEF DESCRIPTION OF DRAWINGS

The accompanying drawings, which are included to provide a further understanding of the present disclosure and are incorporated in and constitute a part of this specification, illustrate embodiments of the present disclosure and together with the description serve to explain the present disclosure, but do not constitute a limitation of the present disclosure.

DETAIL DESCRIPTION OF EMBODIMENTS

Specific embodiments of the present disclosure will be described in detail below in conjunction with the accompanying drawings. It should be understood that the specific embodiments described herein are only used to illustrate and explain the present disclosure and are not intended to limit the present disclosure.

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few embodiments of the present disclosure, but not all embodiments. All other embodiments, which can be derived by a person skilled in the art from the described embodiments of the disclosure without creative effort, are within the protective scope of the present disclosure.

Unless defined otherwise, technical or scientific terms used herein shall have the ordinary meaning as understood by one of ordinary skill in the art to which this disclosure belongs. The use of "first," "second," and the like in this disclosure is not intended to indicate any order, quantity, or importance, but rather is used to distinguish one element from another. Also, the use of the terms "a," "an," or "the" and similar referents does not denote a limitation of quantity, but rather denotes the presence of at least one. The word "comprising/including" or "comprises/includes", and the like, means that the element or item preceding the word contains the element or item listed after the word and its equivalent, but does not exclude other elements or items. The terms "connected" or "coupled" and the like are not restricted to physical or mechanical connections, but may include electrical connections, whether direct or indirect. Terms "upper/on", "lower/below", "left", "right", and the like are used only to indicate relative positional relationships, and when an absolute position of an object being described is changed, the relative positional relationships may be changed accordingly.

Figure 1:
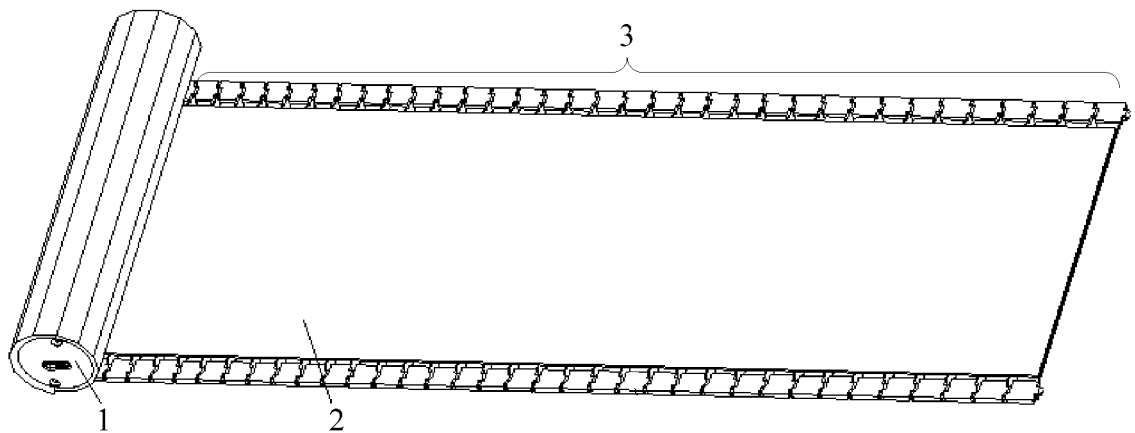
FIG. 1 is a front perspective view of a flexible display device in an unrolled state in the present disclosure.
Figure 2:
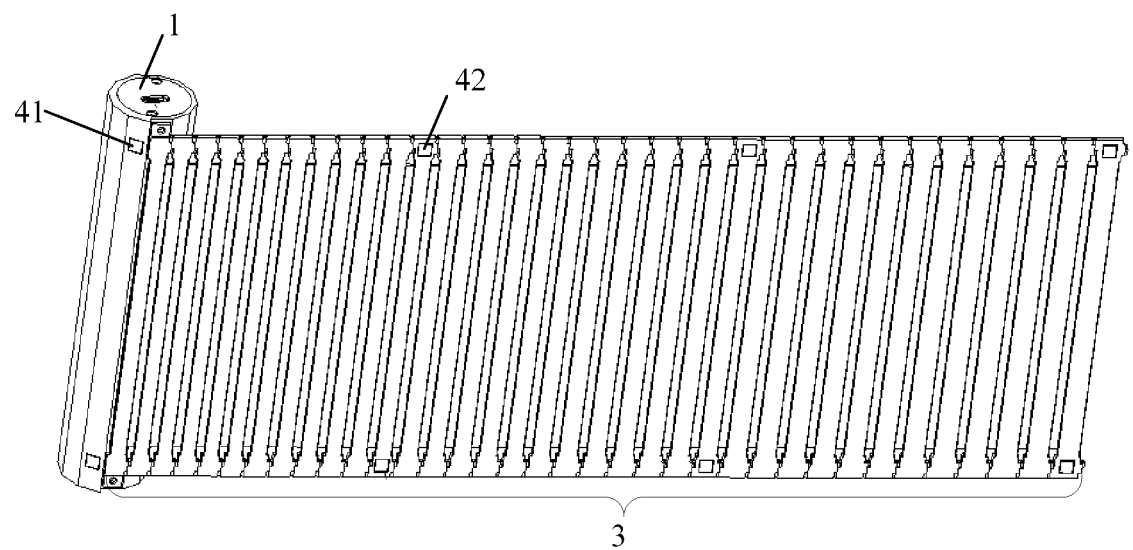
FIG. 2 is a schematic rear view of a flexible display device in an unrolled state in the present disclosure.
Figure 3:
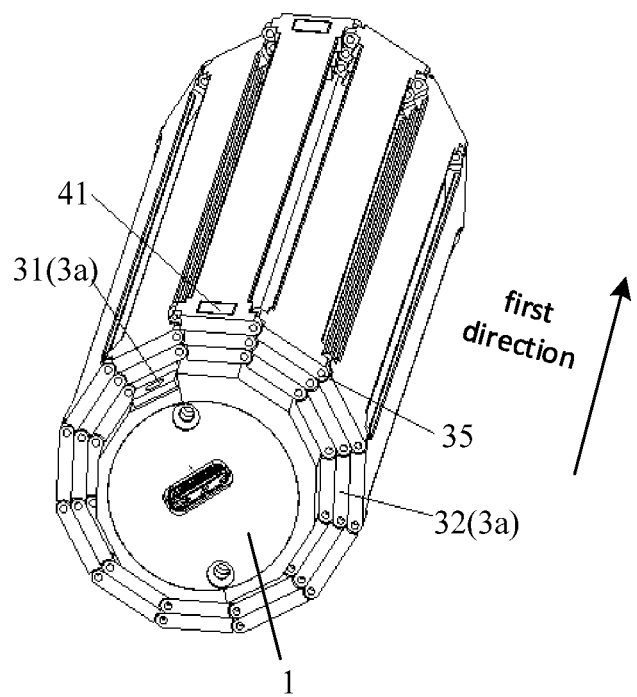
FIG. 3 is a perspective view of a flexible display device in a rolled state in the present disclosure.
Figure 4:
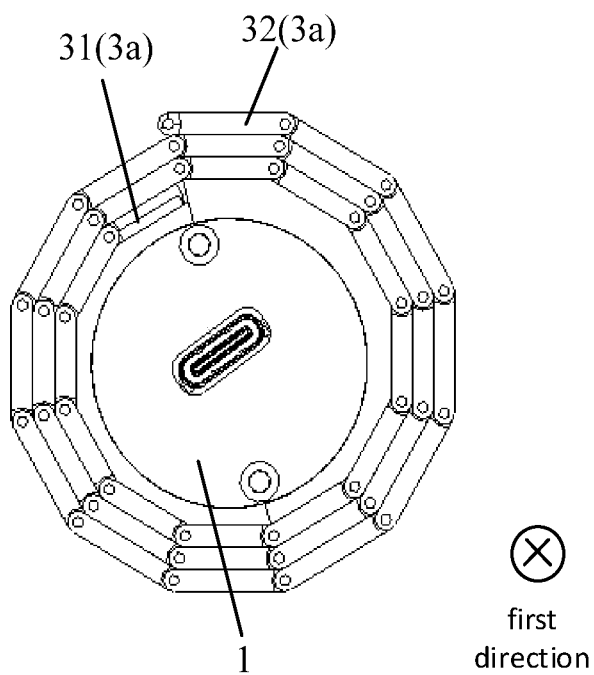
FIG. 4 is a test diagram of a flexible display device in the present disclosure.
Figure 5:
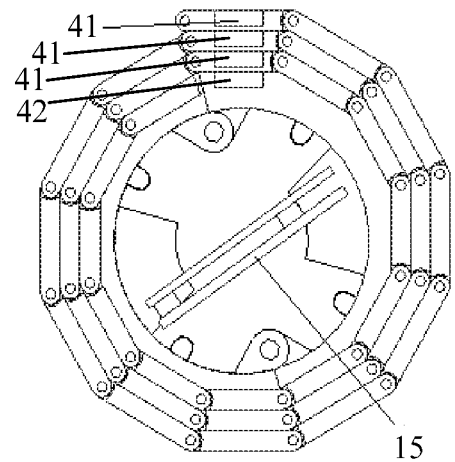
FIG. 5 is a cross-sectional view of a flexible display device in the present disclosure.

FIG. 1 is a front perspective view of a flexible display device, in an unrolled state, provided in the present disclosure, FIG. 2 is a schematic rear view of the flexible display device, in an unrolled state, provided in the present disclosure, FIG. 3 is a perspective view of the flexible display device provided in the present disclosure in a rolled state, FIG. 4 is a test diagram of a flexible display device provided in the present disclosure, and FIG. 5 is a cross-sectional view of the flexible display device provided in the present disclosure, as shown in FIGS. 1 to 5, the flexible display device includes: a flexible display screen 2, a support structure 3, a magnetic assembly. The support structure 3 has a support surface, and the support structure 3 is switchable between a rolled state and an unrolled state such that the support surface of the support structure 3 is switched between a curved surface and a flat surface. The unrolled state of the flexible display device is a state with the support structure 3 being unrolled, and the rolled state of the flexible display device is a state with the support structure 3 being rolled.

The flexible display screen 2 may be a self-luminous display screen 2, such as an OLED (organic light-emitting device) display screen, a MiniLED (mini light-emitting device) display screen, and a MicroLED (micro light-emitting device) display screen. At least part of the flexible display screen 2 is fixed on the support surface of the support structure 3, where the flexible display screen 2 may include a display portion and a driving portion connected with the display portion, the display portion is a portion of the flexible display screen 2 for displaying pictures, the display portion may be fixed on the support surface of the support structure 3, and during the support structure 3 being in an unrolled state, the flexible display screen 2 is unrolled to display pictures; during the support structure 3 being in a rolled state, the flexible display 2 is also rolled up.

The magnetic assembly includes at least two first magnetic elements 41 arranged on the support structure 3, in some implementations, the first magnetic elements 41 may be magnets. The first magnetic members 41 are configured to attract one another during the support structure 3 being in the rolled state, and therefore, during the support structure 3 being in the rolled state, the support structure 3 can be kept stable under the mutual attraction of the first magnetic members, thereby ensuring the stability of the flexible display device being rolled up.

As shown in FIGS. 3 and 4, the support structure 3 includes a plurality of support members 3a each extending along a first direction, the plurality of support members 3a are connected successively, each support member 3a includes a support sub-surface, and support sub-surfaces of the plurality of support members 3a jointly form the support surface of the support structure 3. Every two adjacent support members 3a are hinged to each other so that the two adjacent support members 3a can rotate relatively, thereby allowing the support structure 3 to be switched between the unrolled state and the rolled state. In a case where the flexible display is to display, the support structure 3 is unrolled, and in a case where the flexible display device is not to display, the support structure 3 may be in the rolled state, so as to save space occupied by the flexible display device and make the flexible display device easy to be carried.

The support member 3a may be made of a material having a relatively high density and a relatively high hardness, such as metal, so that during the flexible display device being unrolled, the flexible display screen can be kept flat by the gravity of the support members 3a without warping.

A first mounting recess (not shown) is provided in a surface of the support structure 3 away from the support surface, and the first magnetic member 41 is provided in the first mounting recess. The first mounting recess is provided in the support member 3a. Shapes of the first mounting recess and the first magnetic member 41 are not particularly limited in the present disclosure, and for example, the shapes of the first magnetic member 41 and the first mounting recess may be cylindrical, rectangular parallelepiped, or the like. A thickness of the first magnetic member 41 may be less than or equal to a depth of the first mounting recess, so that the first magnetic member 41 can not protrude from the support member 3a, thereby improving aesthetics of the flexible display device. In an example, the thickness of the first magnetic member 41 is approximately equal to the depth of the first mounting recess.

It should be noted that "approximately equal" in the embodiments of the present disclosure means that a difference between two values is not greater than 5% or not greater than 10%, and certainly, the two values may be completely equal to each other.

In the embodiments of the present disclosure, one or more magnetic assemblies may be provided, in a case where the support structure 3 is in the rolled state, the first magnetic members 41 in a same magnetic assembly are arranged along a radial direction of the support structure in the rolled state and attract one another.

As shown in FIGS. 1 to 5, the flexible display device further includes: a casing 1, a control mainboard 15 provided inside the casing 1 for providing a driving signal for the flexible display screen 2. The support structure 3 is located outside the casing 1 and connected to the casing 1, and is wound on the casing 1 during the support structure 3 being in the rolled state. The flexible display screen 2 includes a display portion and a driving portion connected with the display portion, the display portion is fixed on the support surface of the support structure 3, and the driving portion passes through a first hollow-out portion of the casing 1 and is connected with the control mainboard 15.

Figure 6:
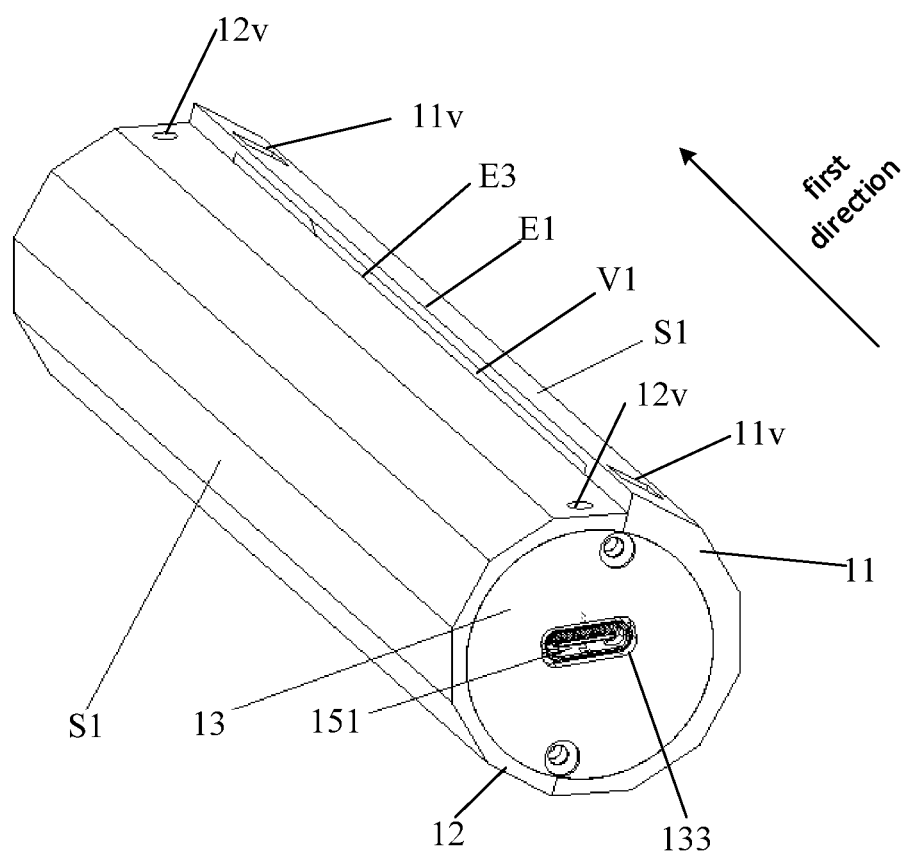
FIG. 6 is a perspective view of a casing provided in the present disclosure at an angle.
Figure 7:
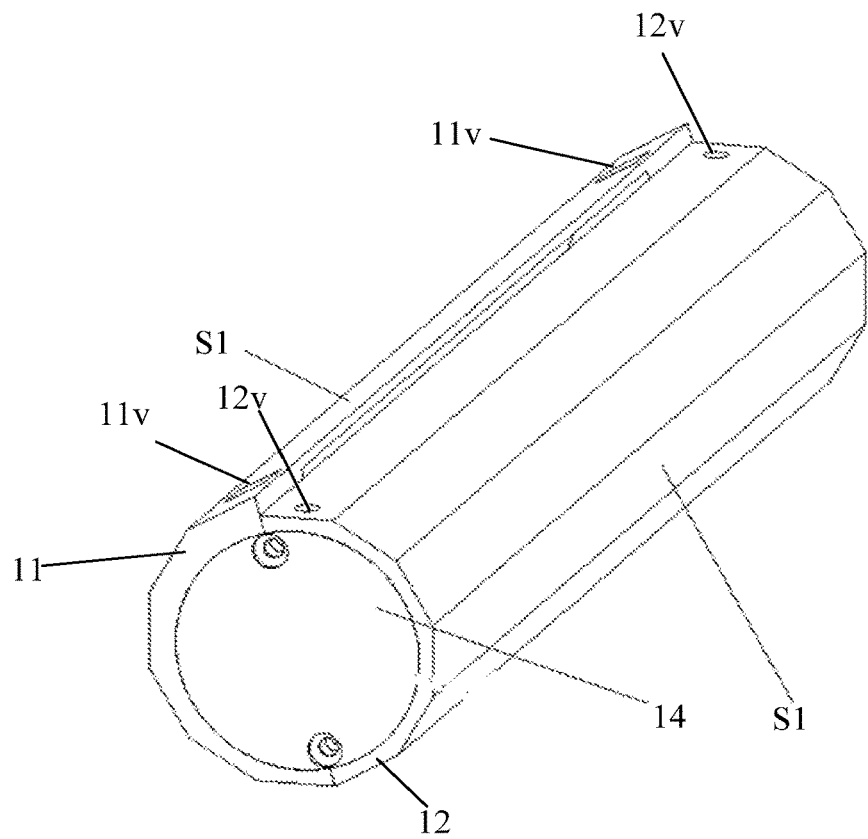
FIG. 7 is a perspective view of a casing provided in the present disclosure at an angle.

FIG. 6 is a perspective view of the casing provided in the present disclosure at an angle, and FIG. 7 is a perspective view of the casing provided in the present disclosure at another angle, as shown in FIGS. 6 and 7, a second mounting recess 11v may be further provided in the casing 1, and the magnetic assembly further includes a second magnetic member 42 disposed in the second mounting recess 11v, and the second magnetic member 42 and the plurality of first magnetic members 41 attract each other during the support structure 3 being in the rolled state, so as to further ensure the stability of the flexible display device in the rolled state. In some implementations, the second magnetic member 42 is a magnet.

Shapes of the second mounting recess 11v and the second magnetic member are not particularly limited in the present disclosure, and in order to improve the attraction force between the first magnetic members 41 and the second magnetic member 42, the shapes of the second magnetic member 42 and the first magnetic members 41 may be the same. A thickness of the second magnetic member 42 may be less than or equal to a depth of the second mounting recess 11v, so as to prevent the second magnetic member 42 from protruding from the casing 1, thereby improving the aesthetics of the flexible display device. In an example, the thickness of the second magnetic member 42 is approximately equal to the depth of the second mounting recess 11v.

As shown in FIGS. 6 and 7, the casing 1 may include: a first casing part 11, a second casing part 12, a first cover plate 13 and a second cover plate 14, where the first casing part 11 and the second casing part 12 are arranged opposite to each other and connected to form a cylindrical structure. The first cover plate 13 and the second cover plate 14 are respectively provided at both ends of the cylindrical structure, and are fixedly connected with the cylindrical structure, the first cover plate 13, the second cover plate 14 and the cylindrical structure forms an accommodating chamber, and the control mainboard 15 is located inside the accommodating chamber.

As shown in FIG. 6, an outer surface of the first casing part 11 has a first edge E1 and a second edge (not shown) disposed opposite to each other, an outer surface of the second casing part 12 has a third edge E3 and a fourth edge (not shown) disposed opposite to each other, the first edge E1, the second edge, the third edge E3 and the fourth edge each extend in the first direction, the first edge E1 is adjacent to the third edge E3, and the second edge is adjacent to the fourth edge.

A step is formed between a portion of the outer surface of the first casing part 11 close to the first edge E1 and a portion of the outer surface of the second casing part 12 close to the third edge E3, and the first hollow-out portion V1 of the casing 1 is located between the first edge E1 and the third edge E3, that is, located on a surface forming the step. The plurality of support members 3a includes: a first support member 31 and a plurality of second support members 32 connected successively, the first support member 31 is fixed at a position on the outer surface of the second casing part 12 close to the third edge E1. As shown in FIG. 6, a fixing hole 12v is provided at a position on the second casing part 12 close to the third edge E3, and a fastener such as a screw may pass through the first support member 31 to be fixed in the fixing hole 12v, thereby fixing the first support member 31 onto the second casing part 12.

Since the step is formed between the first edge of the first casing part 11 and the third edge E3 of the second casing part 12, and the first support member 31 is mounted at the position on the second casing part 12 close to the third edge E3, the plurality of support members 3a may be wound on the cylindrical structure, and the first support member 31 will not squeeze the flexible display screen 2 at outside thereof, thereby preventing the flexible display screen 2 from being damaged.

In addition, it is considered that if an outer surface of the cylindrical structure is a smooth circumferential surface, during the support members 3a being wound on the cylindrical structure, the support sub-surfaces of the support members 3a will be tangent to the circumferential surface, so that a plurality of stress concentration points occur on the flexible display screen 2. To avoid such occurring, in the embodiments of the present disclosure, as shown in FIGS. 6 and 7, the outer surface of the cylindrical structure includes a plurality of flat surfaces S1, and during the support structure 3 being in the rolled state, the surface of each support member 3a facing the cylindrical structure is substantially parallel to one of the flat surfaces S1, so that the problem of stress concentration on the flexible display screen 2 can be mitigated or avoided.

It should be noted that, the outer surface of the cylindrical structure refers to a surface of the cylindrical structure away from the accommodating chamber. Further, two surfaces being substantially parallel means that an angle between the two surfaces is less than a certain value, for example less than 5° or less than 10°, certainly, the two surfaces may be parallel.

As shown in FIG. 5, the plurality of support members 3a of the support structure 3 are wound on the cylindrical structure in an archimedean spiral, the support members 3a in the support structure 3 are divided into a plurality of groups, each group includes multiple support members 3a, and in a case where the support structure 3 is in the rolled state, the support members 3a in a same group are sequentially stacked in a radial direction of the cylindrical structure. For any two support members 3a in the same group, a width of the support member 3a closer to the cylindrical structure is smaller than that of the support member 3a farther away from the cylindrical structure. That is, in the same group, the farther away from the cylindrical structure, the greater the width of the support member 3a is.

In some implementations, the first magnetic members 41 in a same magnetic assembly are disposed on the support members 3a in the same group, and in a case where the support structure 3 is in the rolled state, as shown in FIG. 5, the first magnetic members 41 and the second magnetic member 42 on the casing 1 are arranged along the radial direction of the cylindrical structure.

Figure 8:
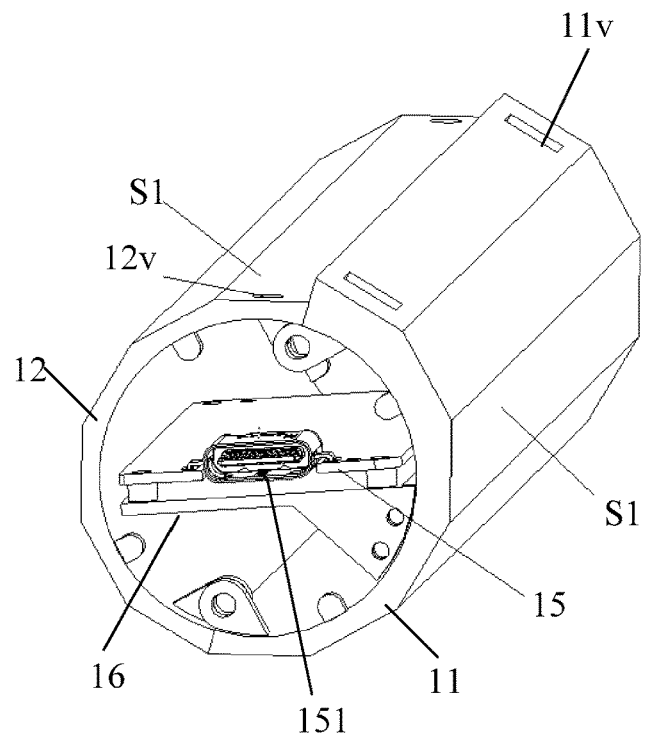
FIG. 8 is a schematic diagram of a cylindrical structure and a control mainboard provided in the present disclosure.
Figure 9:
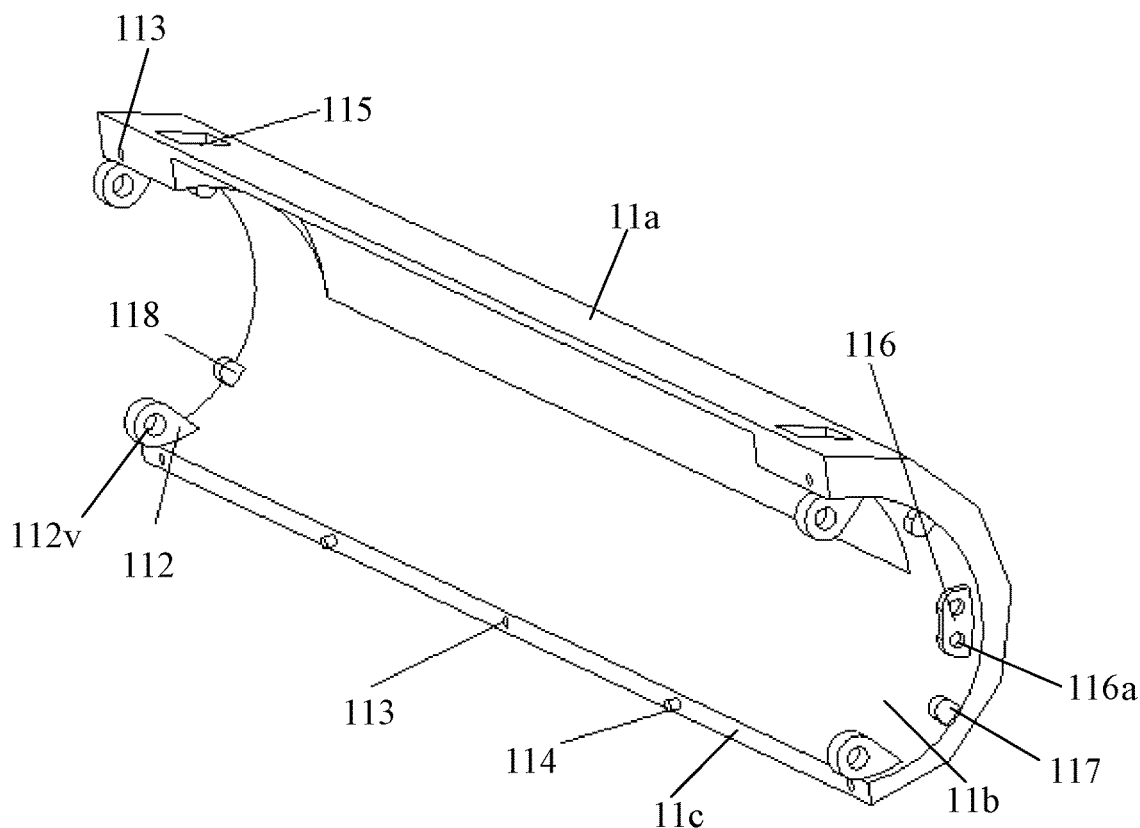
FIG. 9 is a perspective view of a first casing part provided in the present disclosure.
Figure 10:
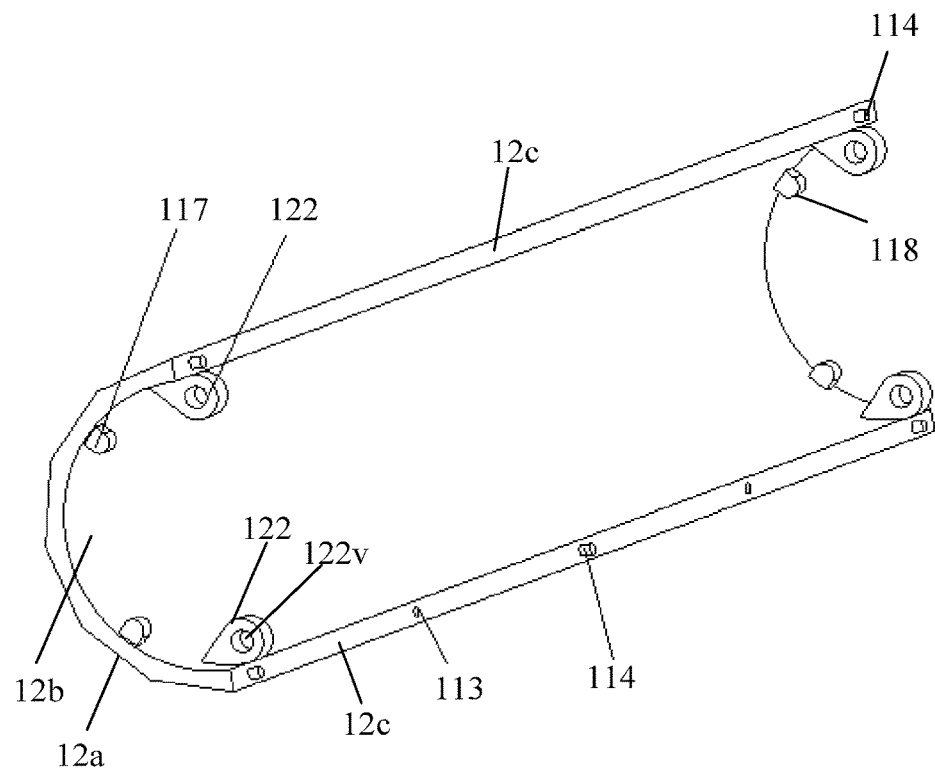
FIG. 10 is a perspective view of a second casing part provided in the present disclosure.
Figure 11:
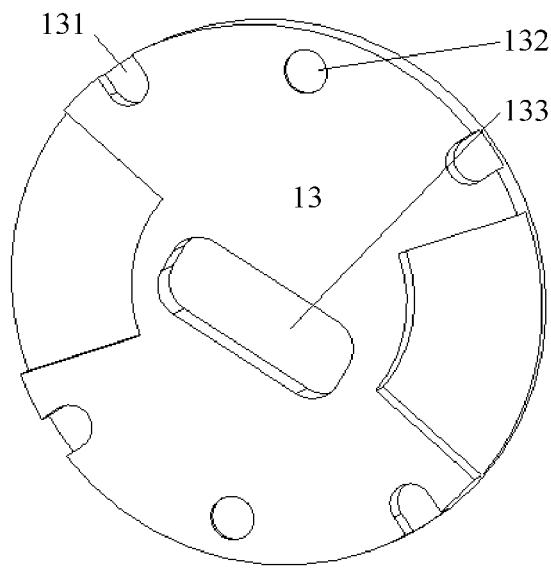
FIG. 11 is a perspective view of a first cover plate provided in the present disclosure.
Figure 12:
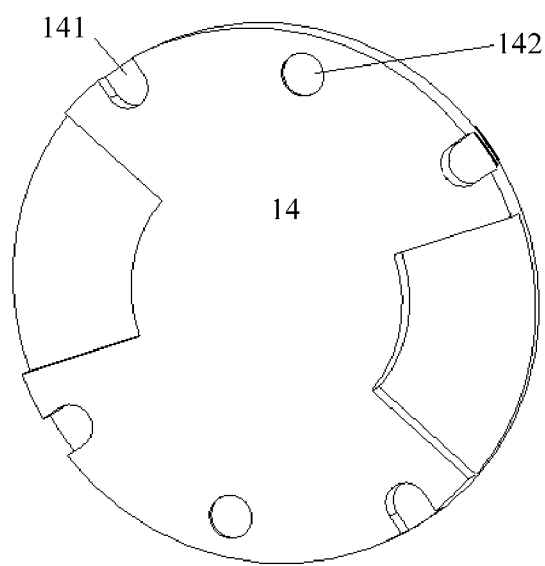
FIG. 12 is a perspective view of a second cover plate provided in the present disclosure.

FIG. 8 is a schematic diagram of the cylindrical structure and the control mainboard provided in the present disclosure, FIG. 9 is a perspective view of the first casing part provided in the present disclosure, FIG. 10 is a perspective view of the second casing part provided in the present disclosure, FIG. 11 is a perspective view of the first cover plate provided in the present disclosure, and FIG. 12 is a perspective view of the second cover plate provided in the present disclosure.

In the embodiments of the present disclosure, the first casing part 11 and the second casing part 12 may be detachably connected, and the first cover 13 and the second cover 14 may be detachably connected to the cylindrical structure, so as to facilitate the assembly of the flexible display device.

The first cover plate 13, the first casing part 11, and the second casing part 12 may be detachably connected by fasteners such as screws. For example, as shown in FIGS. 9 to 10, first mounting members 112 are provided on both ends of the first casing part 11 in the first direction, and the first mounting holes 112v are provided in the first mounting members 112. Second mounting members 122 are provided on both ends of the second casing part 12 along the first direction, and second mounting holes 122v are provided in the second mounting members 122; the first cover plate 13 is provided with a third mounting hole 132 therein, and the second cover plate 14 is provided with a fourth mounting hole 142 therein. In some implementations, the first mounting holes 112v, the second mounting holes 122v, the third mounting hole 132 and the fourth mounting hole 142 are all threaded holes. The third mounting hole 132 is coaxial with the first mounting hole 112v at an end of the first casing part 11 and the second mounting hole 122v at an end of the second casing part 12, the fourth mounting hole 142 is coaxial with the first mounting hole 112v at another end of the first casing part 11 and the second mounting hole 122v at another end of the second casing part 12, and a first screw may be screwed into the third mounting hole 132, and the first mounting hole 112v and the second mounting hole 122v corresponding to the third mounting hole 132, and a second screw may be screwed into the fourth mounting hole 142, and the first mounting hole 112v and the second mounting hole 122v corresponding to the fourth mounting hole 142, so that the first cover plate 13, the second cover plate 14, the first casing part 11, and the second casing part 12 are fixed together.

As shown in FIGS. 9 and 10, the first casing part 11 has an inner surface 11b facing the accommodating chamber, an outer surface 11a facing away from the accommodating chamber, and first connection surfaces 11c connected between the inner surface 11b and the outer surface 11a; the second casing part 12 has an inner surface 12b facing the accommodating chamber, an outer surface 12a facing away from the accommodating chamber, and second connection surfaces 12c connected between the inner surface 12b and the outer surface 12a, and in a case where the first casing part 11 and the second casing part 12 are connected to form the cylindrical structure, the first connection surfaces 11c and the second connection surfaces 12c are in contact. As shown in FIGS. 8 and 9, the casing 1 further includes a positioning assembly, the positioning assembly includes a positioning pillar 114 and a positioning recess 113, one of the positioning pillar 114 and the positioning recess 113 is disposed on the first connection surface 11c, the other of the positioning pillar 114 and the positioning recess 113 is disposed on the second connection surface 12c, and the positioning pillar 114 is inserted into the positioning recess 113. For example, one of the first connection surfaces 11c of the first casing part 11 is provided with a plurality of positioning pillars 114 and a plurality of positioning recess 113 thereon, and another of the first connection surfaces 11c of the first casing part 11 is provided with a plurality of positioning recess 113 therein; positioning recesses 113 matching with the positioning pillars 114 on the first connection surface 11c and positioning pillars 114 matching with the positioning recesses 113 in the first connection surface 11c are disposed on two second connection surfaces 12c of the second casing part 12, respectively. With the positioning assembly, it facilitates the assembly of the first casing part 11 and the second casing part 12, preventing the first casing part 11 and the second casing part 12 from being misplaced or inverted during being assembled.

As shown in FIGS. 9 and 10, a first limit protrusion 117 and a second limit protrusion 118 are disposed on the inner surface of the cylindrical structure, for example, a plurality of first limit protrusions 117 are disposed on an end of the first casing part 11 close to the first cover plate 13 and a plurality of first limit protrusions 117 are disposed on an end of the second casing part 12 close to the first cover plate 13, and a plurality of second limit protrusions 118 are disposed on an end of the first casing part 11 close to the second cover plate 14 and a plurality of second limit protrusions 118 are disposed on an end of the second casing part 12 close to the second cover plate 14. As shown in FIGS. 11 and 12, a surface of the first cover plate 13 facing the second cover plate 14 is provided with first limit recesses 131, and at least part of the first limit protrusions 117 are located in the first limit recesses 131; a surface of the second cover plate 14 facing the first cover plate 13 is provided with second limit recesses 141, and at least part of the second limit protrusions 118 are located in the second limit recesses 141. With the first limit protrusions 117, the second limit protrusions 118, the first limit recesses 131 and the second limit recesses 141, the first cover plate 13 and the second cover plate 14 can be limited, so that the first cover plate 13 and the second cover plate 14 can be conveniently assembled together with the cylindrical structure.

As shown in FIG. 11, a second hollow-out portion is disposed in the first cover plate 13, the second hollow-out portion 133 exposes an external interface 151 on the control motherboard 15, and the external interface 151 is configured to connect an external device, for example, the external interface 151 may be a type-C interface 151.

Figure 13:
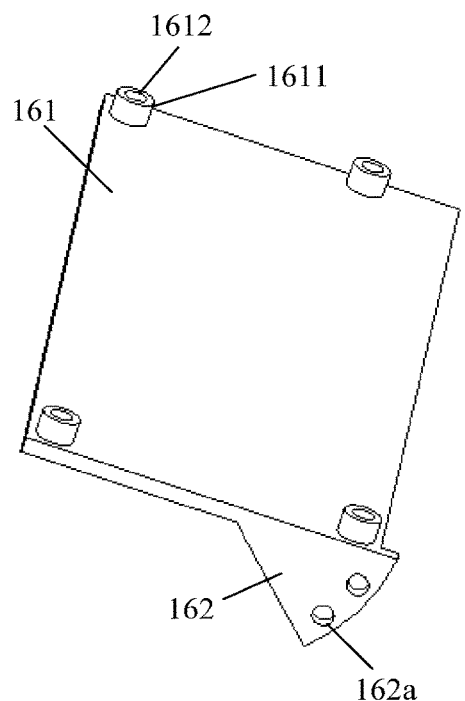
FIG. 13 is a perspective view of a mainboard mounting board provided in the present disclosure.

As shown in FIG. 8, a mainboard mounting board 16 is further disposed inside the casing 1, the mainboard mounting board 16 is fixedly connected to the casing 1, and the control mainboard 15 is fixed on the mainboard mounting board 16. FIG. 13 is a perspective view of a mainboard mounting board provided in the present disclosure, as shown in FIG. 13, the mainboard mounting board 16 includes a carrying plate 161 and a mounting plate 162 which are fixedly connected, the control mainboard 15 is fixed on the carrying plate 161, and the mounting plate 162 is fixedly connected with the casing 1.

For example, as shown in FIG. 13, a mounting pillar 1611 is disposed on the carrying plate 161, a screw hole 1612 is disposed in the mounting pillar 1611, and a screw on the control mainboard 15 is connected with the screw hole 1612, thereby fixing the control mainboard 15 onto the carrying plate 161. The mounting plate 162 is provided with a fifth mounting hole 162a, and as shown in FIG. 9, the inner surface of the first casing part 11 is further provided with a fixing member 116, and the fixing member is provided with a sixth mounting hole 116a, and the mainboard mounting plate 16 and the first casing part 11 are fixedly connected by a fixing member such as a screw passing through the fifth mounting hole 162a and the sixth mounting hole 116a.

Figure 14:
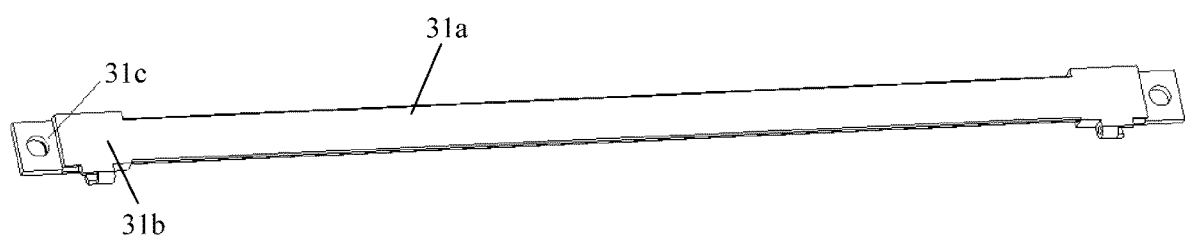
FIG. 14 is a perspective view of a first support member provided in the present disclosure.
Figure 15:
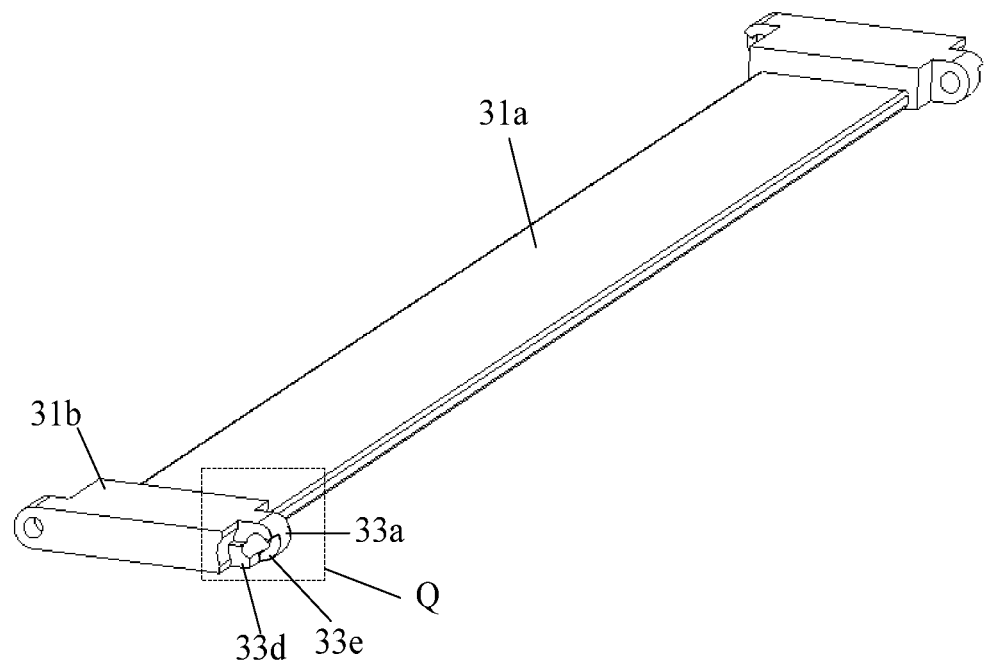
FIG. 15 is a perspective view of a second support member provided in the present disclosure.
Figure 16:
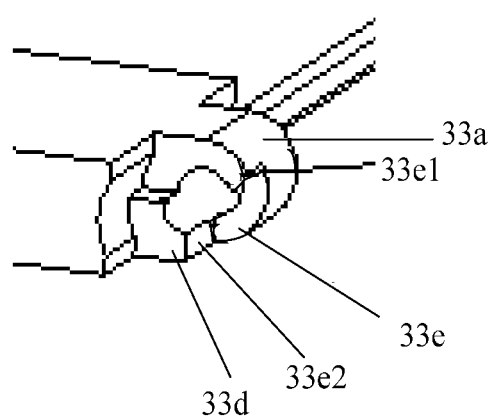
FIG. 16 is an enlarged view of a region Q in FIG. 15.
Figure 17:
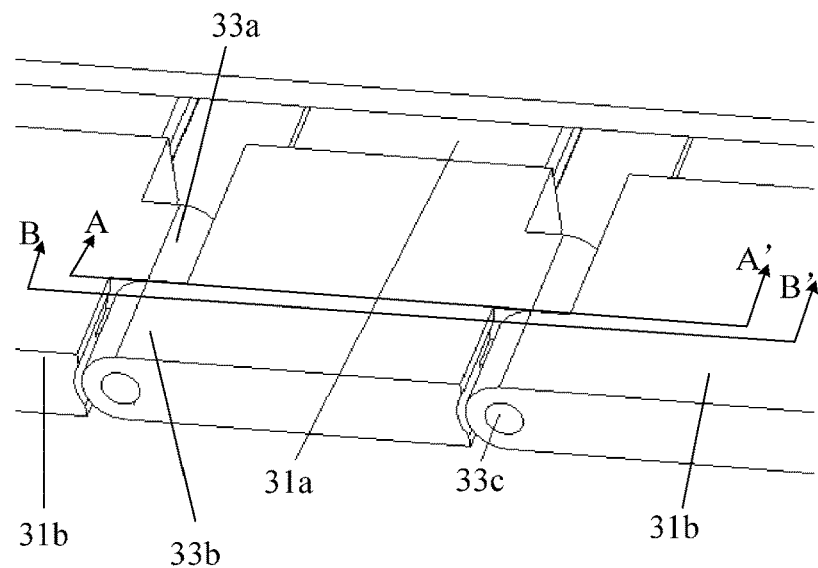
FIG. 17 is a schematic view illustrating a connection between adjacent support members during a support structure being in an unrolled state.
Figure 18:
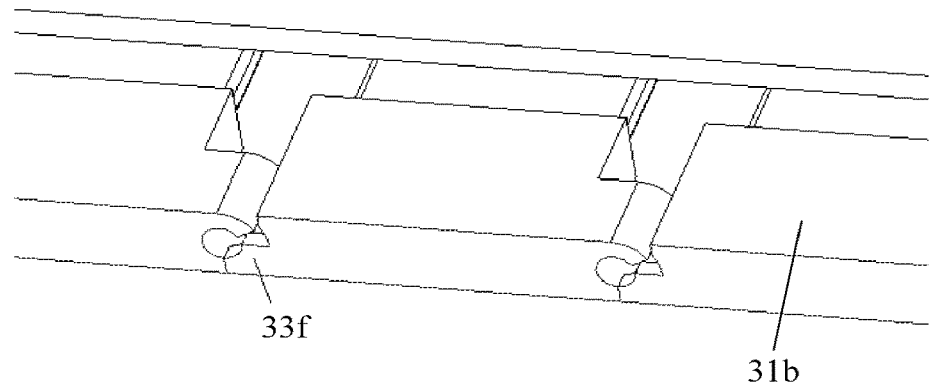
FIG. 18 is a cross-sectional view of a structure in FIG. 17 taken along a line A-A'.
Figure 19:
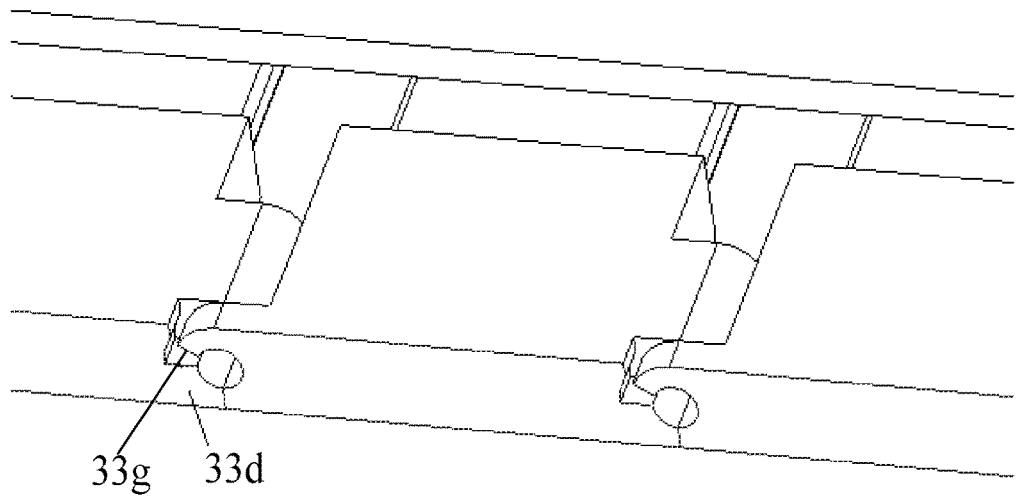
FIG. 19 is a cross-sectional view of a structure in FIG. 17 taken along a line B-B'.
Figure 20:
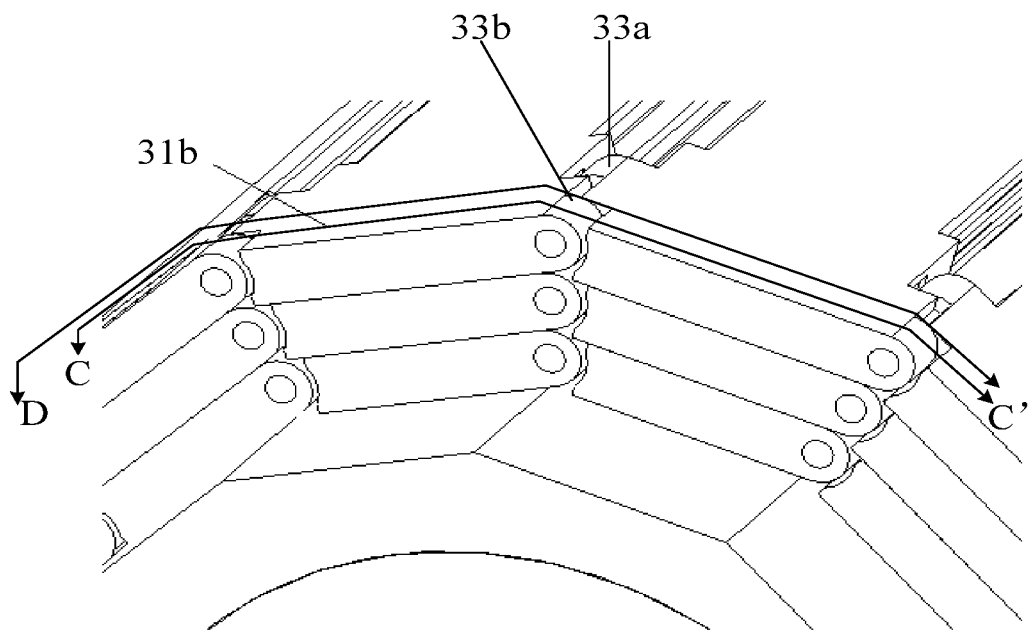
FIG. 20 is a schematic view illustrating a connection between adjacent support members during the support structure being in a rolled state.
Figure 21:
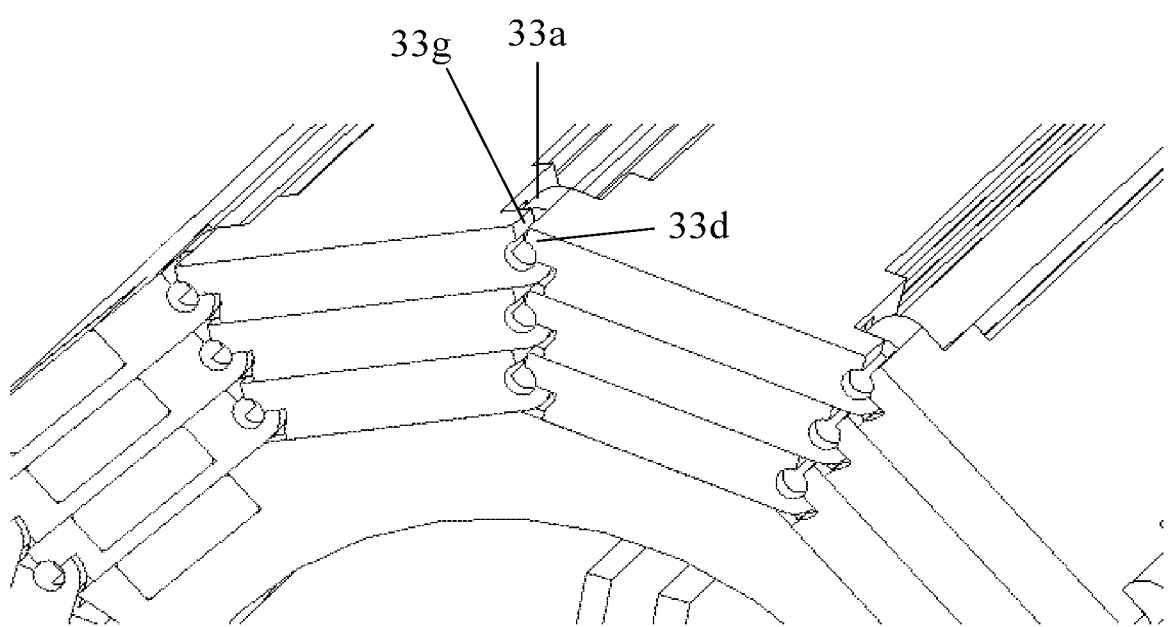
FIG. 21 is a cross-sectional view of a structure in FIG. 20 taken along a line C-C'.
Figure 22:
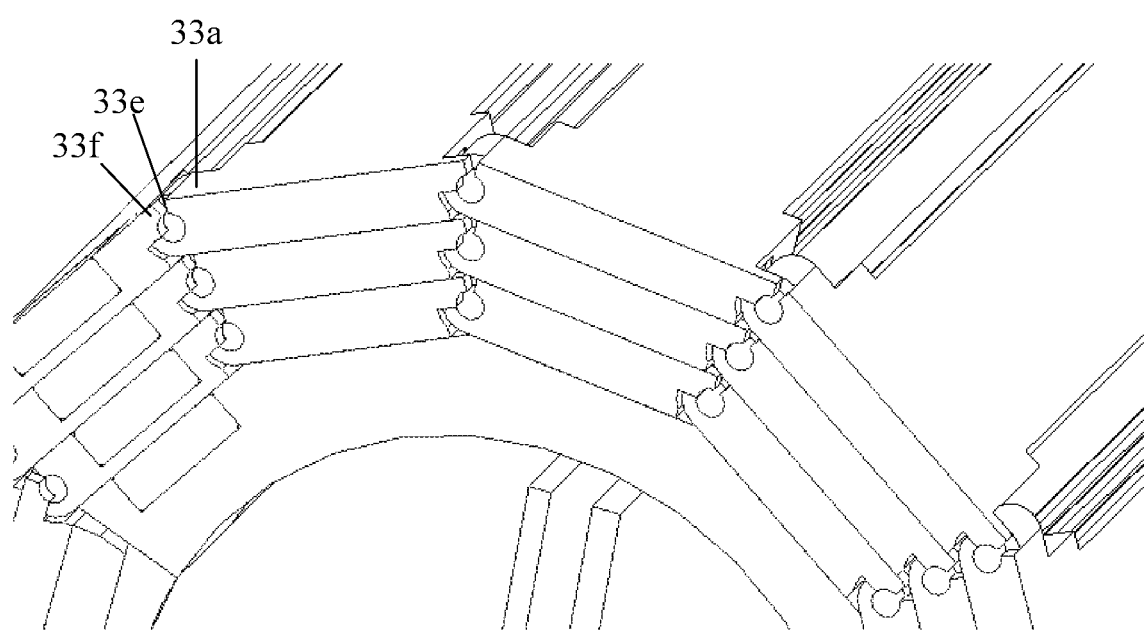
FIG. 22 is a cross-sectional view of a structure in FIG. 20 taken along a line D-D'.

FIG. 14 is a perspective view of a first support member provided in the present disclosure, FIG. 15 is a perspective view of a second support member provided in the present disclosure, FIG. 16 is an enlarged view of a region Q in FIG. 15, FIG. 17 is a schematic view illustrating a connection between adjacent support members during the support structure being in the unrolled state, FIG. 18 is a cross-sectional view of a structure in FIG. 17 taken along a line A-A', FIG. 19 is a cross-sectional view of a structure in FIG. 17 taken along a line B-B', FIG. 20 is a schematic view illustrating a connection between adjacent support members during the support structure being in the rolled state, FIG. 21 is a cross-sectional view of a structure in FIG. 20 taken along a line C-C', and FIG. 22 is a cross-sectional view of a structure in FIG. 20 taken along a line D-D'. As shown in FIGS. 14 and 15, each support member 3a includes: a body portion 31a, and connection portions 31b located at both ends of the body portion 31a, where the connection portions 31b are fixedly connected with the body portion 31a. The body portion 31a extends along the first direction, and the two ends of the body portion 31a are two ends arranged along the first direction. The support sub-surface of the support member 3a is a surface of the body portion 31a facing the cylindrical structure. For the first support member 31, a fixing portion 31c is further disposed on a side of each connection portion 31b away from the body portion 31a, and a screw hole is disposed in each fixing portion 31c, a screw is fixed in the fixing hole 12v in the second casing part 12 through the screw hole, so as to fix the first support member 31 onto the second casing part 12.

As shown in FIG. 3, every two adjacent support members 3a are connected by a hinge assembly 35, the two adjacent support members 3a may be connected by two hinge assemblies 35, and the two hinge assemblies are respectively located at two ends of the support member 3a. As shown in FIG. 17, the hinge assembly includes: a first shaft sleeve 33a, a second shaft sleeve 33b and a pin shaft 33c, the first shaft sleeve 33a and the second shaft sleeve 33b are respectively fixed on the connection portions 31b of two adjacent support members 3a, a first pin hole is formed in the first shaft sleeve 33a, a second pin hole coaxial with the first pin hole is formed in the second shaft sleeve 33b, the pin shaft 33c is inserted into the first pin hole and the second pin hole and extends along the first direction, and the two adjacent support members 3a are configured to rotate around an axis of the pin shaft 33c relatively.

In some implementations, the connection portion 31b and the first shaft sleeve 33a connected therewith may be formed into one piece, and the connection portion 31b and the second shaft sleeve 33b connected therewith may be formed into one piece.

In some implementations, the hinge assembly further includes a limit structure connected to at least one of the first shaft sleeve 33a and the second shaft sleeve 33b for limiting an angle that the two adjacent support members 3a relatively rotate, thereby preventing the flexible display screen 2 from being excessively bent.

As shown in FIGS. 15 to 22, the hinge assembly may specifically include: a first bump 33d, a first recess 33e, a second bump 33f and a second recess 33g, the first bump 33d and the first recess 33e are disposed at an end of the first shaft sleeve 33a close to the second shaft sleeve 33b, the second bump 33f and the second recess 33g are disposed at an end of the second shaft sleeve 33b close to the first shaft sleeve 33a.

The first recess 33e has a first limit surface 33e1 and a second limit surface 33e2, the second recess 33g has a third limit surface and a fourth limit surface (not shown), at least part of the first bump 33d is located in the second recess 33g, at least part of the second bump 33f is located in the first recess 33e, and, during the two adjacent support members 3a relatively rotate, the first bump 33d moves between the third limit surface and the fourth limit surface, and the second bump 33f moves between the first limit surface 33e1 and the second limit surface 33e2, thereby restricting the angle that the support members 3a relatively rotate. Sizes of the first bump 33d, the second bump 33f, the first recess 33e and the second recess 33g may be designed according to a desired angle that the two adjacent support members relatively rotate. In an example, during the support structure 3 being in the rolled state, an angle between the support sub-surfaces of the two adjacent support members 3a is greater than or equal to 150°.

It will be understood that the above embodiments are merely exemplary embodiments employed to illustrate the principles of the present disclosure, and the present disclosure is not limited thereto. It will be apparent to those skilled in the art that various improvements and modifications can be made without departing from the spirit and scope of the present disclosure, and these improvements and modifications are to be considered within the scope of the present disclosure.

What is claimed is:

1. A flexible display device, comprising:
    a support structure, which is switchable between a rolled state and an unrolled state to switch a support surface of the support structure between a curved surface and a flat surface;
    a flexible display screen, at least a portion of which is fixed onto the support surface of the support structure;
    a magnetic assembly comprising a plurality of first magnetic members disposed on the support structure, wherein the first magnetic members are configured to attract one another in response to the support structure being in the rolled state;
    a casing and a control mainboard, wherein the control mainboard is arranged inside the casing, the support structure is connected with the casing, and the support structure is wound on the casing during the support structure being in the rolled state;
    the flexible display screen comprises a display portion and a driving portion connected with the display portion, wherein the display portion is fixed on the support surface of the support structure, and the driving portion passes through a first hollow-out portion of the casing and is connected with the control mainboard;
    wherein the casing comprises: a first casing part and a second casing part arranged opposite to each other and connected to form a cylindrical structure; an outer surface of the first casing part has a first edge and a second edge arranged opposite to each other, an outer surface of the second casing part has a third edge and a fourth edge arranged opposite to each other, the first edge, the second edge, the third edge and the fourth edge each extend along the first direction, the first edge is adjacent to the third edge, and the second edge is adjacent to the fourth edge;
    a step is formed between a portion of the outer surface of the first casing part close to the first edge and a portion of the outer surface of the second casing part close to the third edge, the plurality of support members comprises: a first support member and a plurality of second support members that are connected successively, the first support member is fixed to a position on the outer surface of the second casing part close to the third edge.

2. The flexible display device of claim 1, wherein first mounting recesses are provided on a surface of the support structure away from the support surface, the first magnetic members are arranged in the first mounting recesses.

3. The flexible display device of claim 1, wherein a second mounting recess is provided on the casing, the magnetic assembly further comprises a second magnetic member disposed in the second mounting recess, and the second magnetic member attracts the first magnetic members during the support structure being in the rolled state.

4. The flexible display device of claim 1, wherein the support structure comprises a plurality of support members each extending in a first direction, each support member comprises a support sub-surface, support sub-surfaces of the support members jointly form the support surface, and every two adjacent support members are hinged with each other.

5. The flexible display device of claim 1, wherein an outer surface of the cylindrical structure comprises a plurality of flat surfaces, a surface of each support member facing the cylindrical structure is substantially parallel to one of the flat surfaces during the support structure being in the rolled state.

6. The flexible display device of claim 1, wherein the first casing part comprises first connection surfaces connected between an inner surface and an outer surface of the first casing part, the second casing part comprises second connection surfaces connected between an inner surface and an outer surface of the second casing part, the first connection surfaces are in contact the second connection surfaces;
    the casing further comprises a positioning assembly, which comprises a positioning pillar and a positioning recess, one of the positioning pillar and the positioning recess is provided on the first connection surface, and the other of the positioning pillar and the positioning recess is provided on the second surface, the positioning pillar is inserted into the positioning recess.

7. The flexible display device of claim 1, wherein the plurality of support members are divided into a plurality of groups, each group comprises multiple support members, and the support members in a same group are sequentially stacked in a radial direction of the cylindrical structure during the support structure being in the rolled state;

for any two of the support members in the same group, a width of the support member closer to the cylindrical structure is less than a width of the support member farther away from the cylindrical structure.

8. The flexible display device of claim 1, wherein the casing further comprises a first cover plate and a second cover plate that are disposed opposite to each other, the first cover plate and the second cover plate are respectively disposed at two ends of the cylindrical structure and are fixedly connected to the cylindrical structure, the first cover plate, the second cover plate and the cylindrical structure form an accommodating chamber, and the control mainboard is located in the accommodating chamber.

9. The flexible display device of claim 8, wherein a first limit protrusion and a second limit protrusion are provided on an inner surface of the cylindrical structure, a first limit recess is provided on a surface of the first cover plate facing the second cover plate, and at least part of the first limit protrusion is located in the first limit recess;

a second limit recess is provided on a surface of the second cover plate facing the first cover plate, and at least part of the second limit protrusion is located in the second limit recess.

10. The flexible display device of claim 8, wherein a second hollow-out portion is arranged in the first cover plate, and the second hollow-out portion exposes an external interface on the control mainboard, and the external interface is configured to connect an external device.

11. The flexible display device of claim 1, further comprising a mainboard mounting board provided inside the casing, the mainboard mounting board is connected to the casing, and the control mainboard is fixed to the mainboard mounting board.

12. The flexible display device of claim 4, wherein each support member comprises a body portion extending in the first direction, and connection portions at both ends of the body portion, the connection portions are fixedly connected to the body portion;

every two adjacent support members are connected through a hinge assembly, and the hinge assembly comprises: a first shaft sleeve, a second shaft sleeve and a pin shaft, wherein the first shaft sleeve and the second shaft sleeve are respectively fixed on the connection portions of two adjacent support members, a first pin hole is formed in the first shaft sleeve, a second pin hole coaxial with the first pin hole is formed in the second shaft sleeve, the pin shaft is inserted into the first pin hole and the second pin hole and extends along the first direction, and the two adjacent support members relatively rotate around an axis of the pin shaft.

13. The flexible display device of claim 12, wherein the hinge assembly further comprises a limit structure connected with at least one of the first shaft sleeve and the second shaft sleeve and configured to limit an angle that the two adjacent support members relatively rotate.

14. The flexible display device of claim 13, wherein the limit structure comprises: a first bump and a first recess arranged at an end of the first shaft sleeve close to the second shaft sleeve; and a second bump and a second recess arranged at an end of the second shaft sleeve close to the first shaft sleeve;

the first recess comprises a first limit surface and a second limit surface, the second recess comprises a third limit surface and a fourth limit surface, at least part of the first bump is located in the second recess, at least part of the second bump is located in the first recess, in response to that the two adjacent support members rotate relatively, the first bump moves between the third limit surface and the fourth limit surface, and the second bump moves between the first limit surface and the second limit surface.

15. The flexible display device of claim 3, further comprising a mainboard mounting board provided inside the casing, the mainboard mounting board is connected to the casing, and the control mainboard is fixed to the mainboard mounting board.

16. The flexible display device of claim 4, further comprising a mainboard mounting board provided inside the casing, the mainboard mounting board is connected to the casing, and the control mainboard is fixed to the mainboard mounting board.

17. The flexible display device of claim 1, wherein each support member comprises a body portion extending in the first direction, and connection portions at both ends of the body portion, the connection portions are fixedly connected to the body portion;

every two adjacent support members are connected through a hinge assembly, and the hinge assembly comprises: a first shaft sleeve, a second shaft sleeve and a pin shaft, wherein the first shaft sleeve and the second shaft sleeve are respectively fixed on the connection portions of two adjacent support members, a first pin hole is formed in the first shaft sleeve, a second pin hole coaxial with the first pin hole is formed in the second shaft sleeve, the pin shaft is inserted into the first pin hole and the second pin hole and extends along the first direction, and the two adjacent support members relatively rotate around an axis of the pin shaft.

18. The flexible display device of claim 5, wherein each support member comprises a body portion extending in the first direction, and connection portions at both ends of the body portion, the connection portions are fixedly connected to the body portion;

every two adjacent support members are connected through a hinge assembly, and the hinge assembly comprises: a first shaft sleeve, a second shaft sleeve and a pin shaft, wherein the first shaft sleeve and the second shaft sleeve are respectively fixed on the connection portions of two adjacent support members, a first pin hole is formed in the first shaft sleeve, a second pin hole coaxial with the first pin hole is formed in the second shaft sleeve, the pin shaft is inserted into the first pin hole and the second pin hole and extends along the first direction, and the two adjacent support members relatively rotate around an axis of the pin shaft.

* * * * *